INVENTOR
ALLEN F. RHODES
ELDERT B. POOL
MATHEW L. FREEMAN
BY Strauch, Nolan, Neale, Nies & Kurz
ATTORNEYS

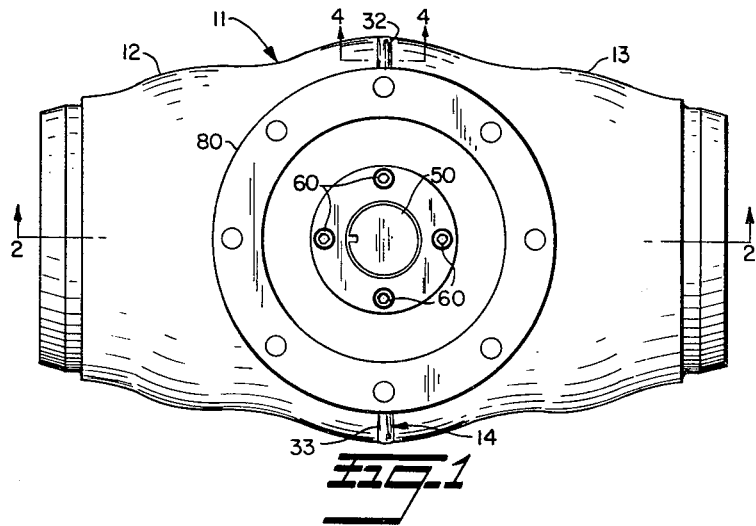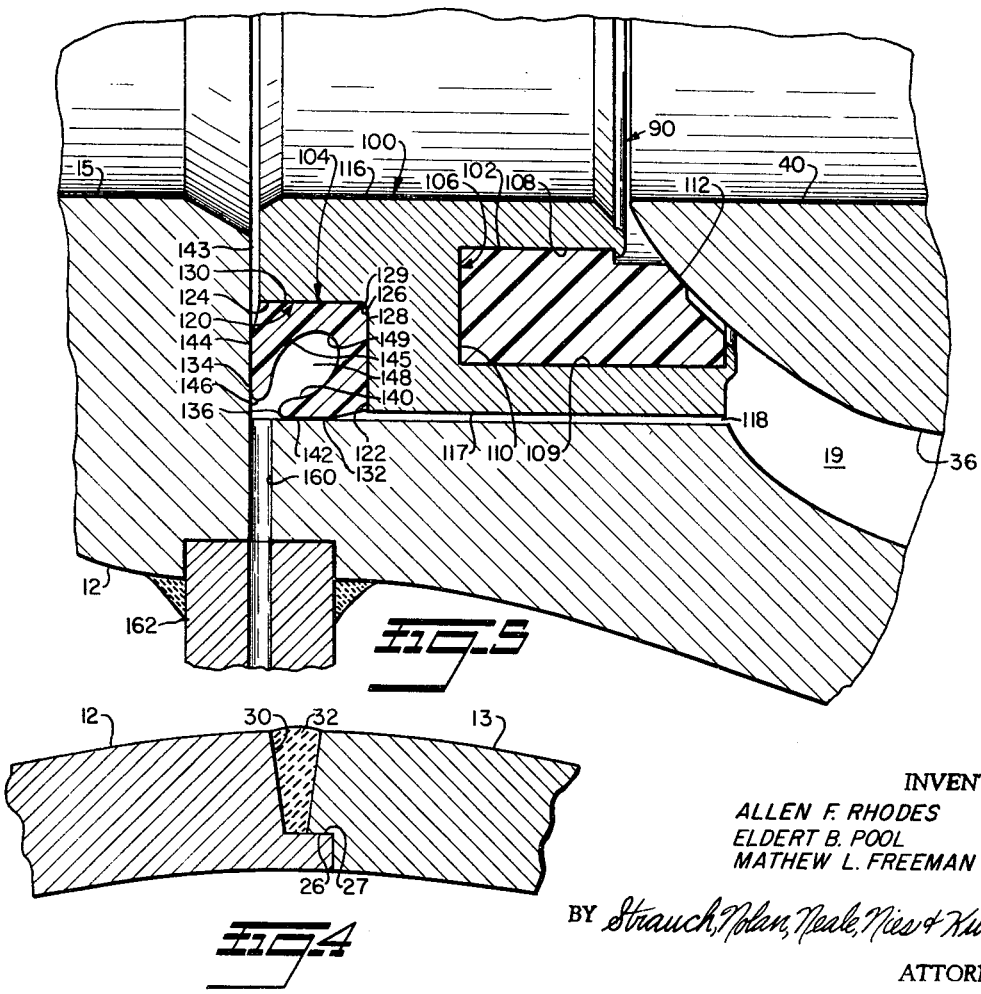

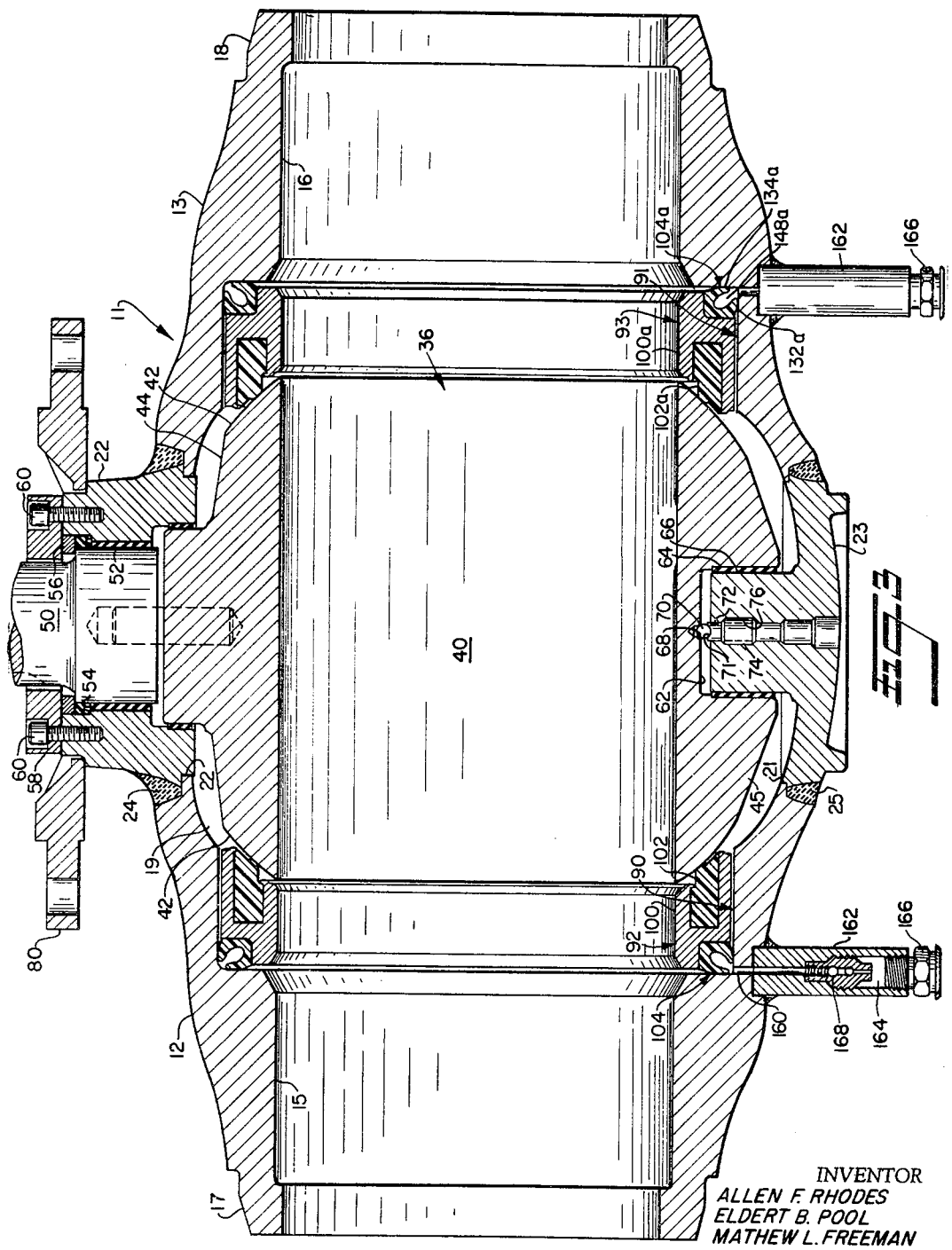

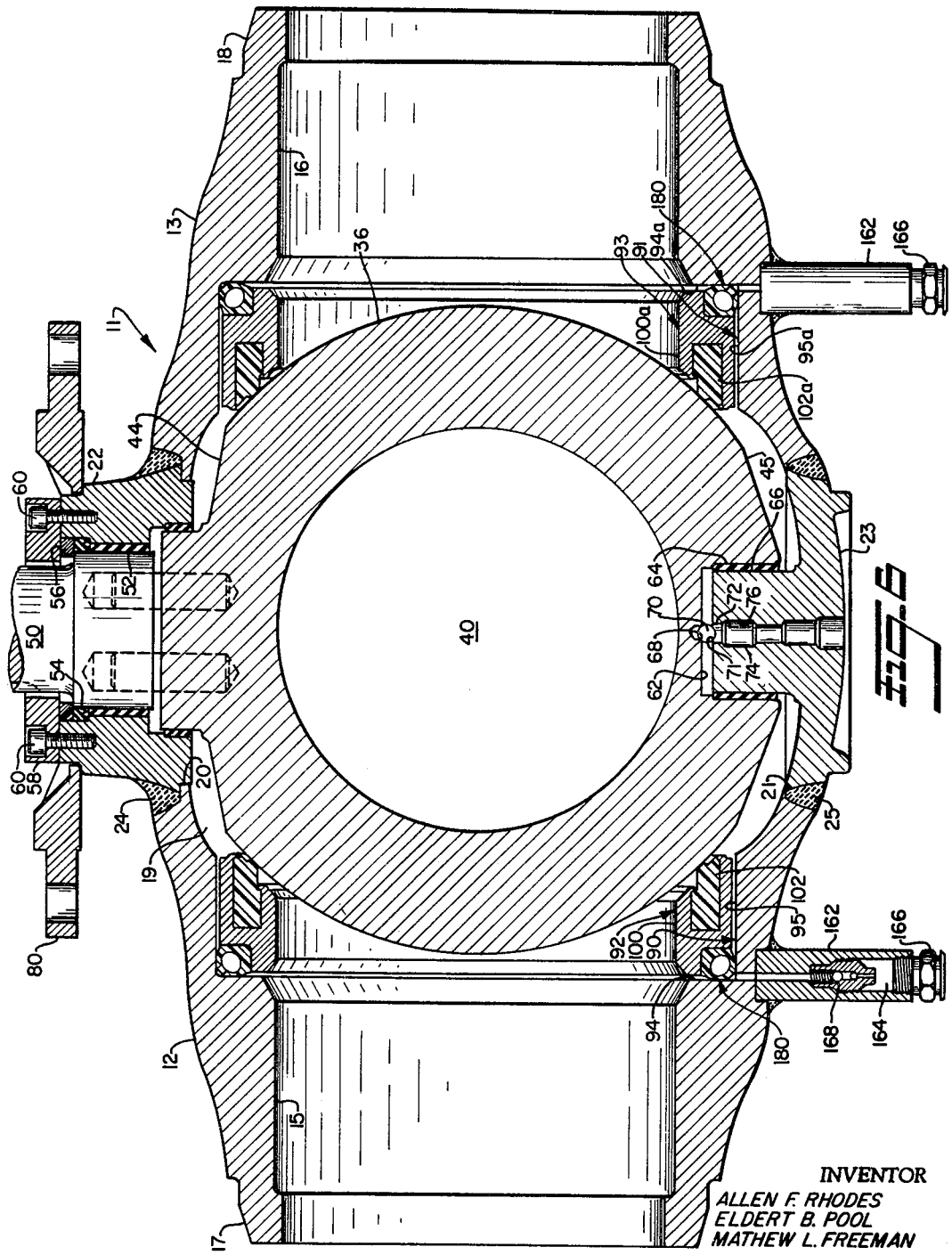
INVENTOR
ALLEN F. RHODES
ELDERT B. POOL
MATHEW L. FREEMAN
BY *Strauch, Nolan, Neale, Nies & Kurz*
ATTORNEYS

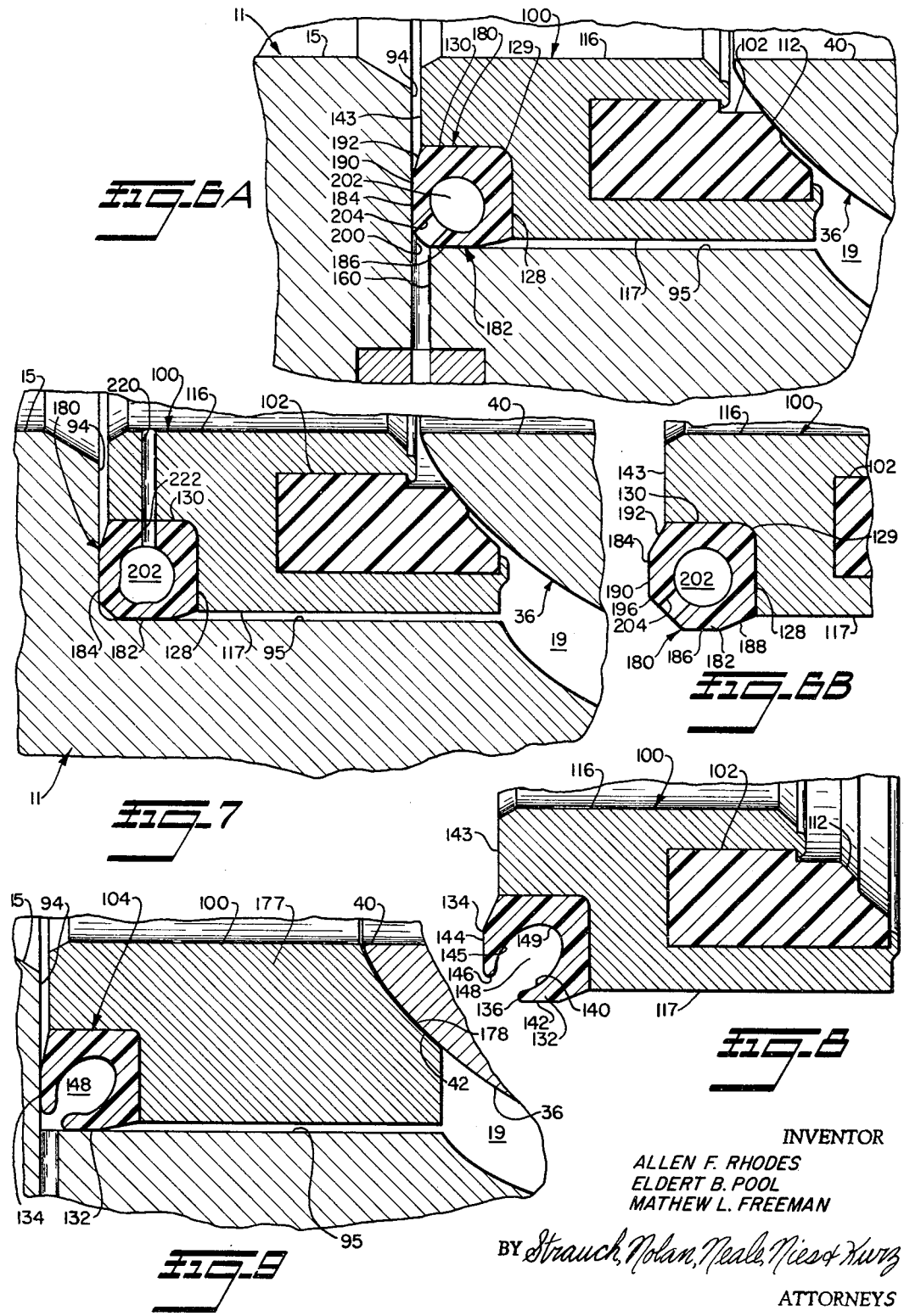

United States Patent Office 3,508,736
Patented Apr. 28, 1970

3,508,736
SEAT RING ASSEMBLIES FOR VALVES
Allen F. Rhodes and Eldert B. Pool, Pittsburgh, and Mathew L. Freeman, Mars, Pa., assignors to Rockwell Manufacturing Company, Pittsburgh, Pa., a corporation of Pennsylvania
Filed May 24, 1967, Ser. No. 641,007
Int. Cl. F16k 25/00, 5/06, 15/04
U.S. Cl. 251—172
36 Claims

ABSTRACT OF THE DISCLOSURE

A ball type valve plug seat ring construction having an annular elastomeric member bonded to a rigid seat ring and formed with elastically deformable, dual seat-to-valve body sealing lips. The lips are so oriented as to respectively resiliently bias the valve plug seat ring radially with respect to fluid flow through the valve and axially toward the plug to establish a seat-to-plug seal.

FIELD OF INVENTION

This invention relates to plug valves of the type wherein a plug is rotatably mounted on cooperating seat ring surfaces in a valve body. Valves of this type are sometimes referred to as ball valves.

BACKGROUND

Conventional ball valve seat rings usually are dimensioned to have a sliding fit in the valve body bore and therefore must be sealed to the wall of the body. A mechanical force also must be applied to the seat ring to bias it in an axial direction for establishing sealing contact with the ball. These requirements were satisfied prior to this invention by providing a suitable sealing member, such as an O-ring, and a separate spring member, such as a Belleville spring, wave spring, or a plurality of coiled springs.

SUMMARY OF INVENTION AND OBJECTS

One of the major objects of this invention is to provide a novel, simplified seat ring structure which incorporates the functions of axial bias or thrust and seat-to-valve body sealing into a single part.

The foregoing object is accomplished by bonding to the seat ring an elastically deformable, annular member having circumferentially and radially extending sealing surfaces which may be formed on resiliently compressible lips or raised lands and which respectively engage the smooth cylindrical wall surface of the valve body bore and a radially extending, annular shoulder in the bore. By compressing the radial lip or land against the annular valve body shoulder the seat ring is biased to a position where sealing contact is established with the ball. The seat ring may be metallic and may mount an elastomeric insert which sealingly engages the spherical surface of the ball.

When the direction of fluid flow is such that the seat ring is on the high pressure side of the valve, the radially directed lip will be flexed allowing line fluid to enter an annular recess defined between the two lips and to apply pressure to radially compress the circumferentially oriented lip into bubble tight sealing contact with the cylindrical wall of the valve body bore. When flow is reversed such that the seat ring is on downstream, low pressure side of the valve, fluid pressure in the valve plug cavity of the body is capable of flexing the circumferential lip inwardly, allowing fluid to enter the annular recess between the two lips to aply pressure for coming the radial lip into bubble-tight sealing contact with the internal valve body shoulder.

In one embodiment fluid pressure from an external source may be introduced into the recess between the two lips to compress them againt their respective valve body surfaces.

In another embodiment the annular, elastically deformable, valve seat spring member having the dual seat-to-valve body seals is formed with a torous hole which provides a flatter spring rate curve as compared with a solid annular member. This allows the seat ring, which radially floats on the circumferential seal, to provide tight sealing contact with the valve plug without excessive seat-to-ball loading as the clearance between the seat ring and valve body bore varies when the seat ring shifts in the valve body bore to align with the ball type plug. Fluid pressure from an external source may be introduced to expand the torous hole and thereby pressure energize the radial and circumferential seat-to-valve body seats.

Accordingly, a more specific object of this invention is to provide a novel ball type valve plug seat ring assembly having an elastically deformable annular spring member bonded to the seat ring and providing dual seat-to-valve body seals which respectively establish sealing contact with radially and circumferentially directed surfaces of the valve body bore.

Another object of this invention is to provide a novel elastically deformable, annular valve seat spring having radially and axially compressible sealing lips which are compressed against the interior of the valve body to respectively provide upstream and downstream seat-to-valve body seals.

A further object of this invention is to provide a novel elastically deformable, annular valve seat spring wherein an annular recess is defined between the circumferential and axial compressible sealing lips and wherein fluid under pressure is introduced into the annular recess for compressing the lip against the interior valve body bore surfaces.

Still another object of this invention is to provide the elastically deformable seat spring with a torous hole for reducing its spring rate.

A further object of this invention is to provide for the introduction of fluid pressure into the torous hole to expand the hole and compress the dual seat-to-valve body seals axially and radially against their respectively valve body surfaces.

Further objects of this invention will appear as the description proceeds in connection with the appended claims and annexed drawings wherein:

FIG. 1 is a plan view showing a ball type plug valve assembly constructed according to one embodiment of this invention;

FIG. 3 is a longitudinal section like FIG. 2, but showing the assembly in valve opened condition;

FIG. 4 is an enlarged fragmentary section taken substantially along lines 4—4 of FIG. 1;

FIG. 5 is an enlarged, fragmentary view of the seat ring construction shown in FIGS. 2 and 3;

FIG. 6 is a longitudinal section showing an alternate embodiment of the invention;

FIG. 6A is an enlarged, fragmentary, section illustrating the seat ring of FIG. 6, with FIG. 6B showing the modified seat ring spring in its undeformed condition;

FIG. 7 is an enlarged fragmentary, sectioned view showing a modification of the embodiment illustrated in FIG. 6;

FIG. 8 is an enlarged, fragmentary section illustrating the valve seat spring member of FIG. 5 in its undeformed condition; and FIG. 9 is a view similar to FIG. 5, but showing a modified seat ring construction without an elastomeric insert for establishing a seat-to-valve plug seal.

Figure 2:
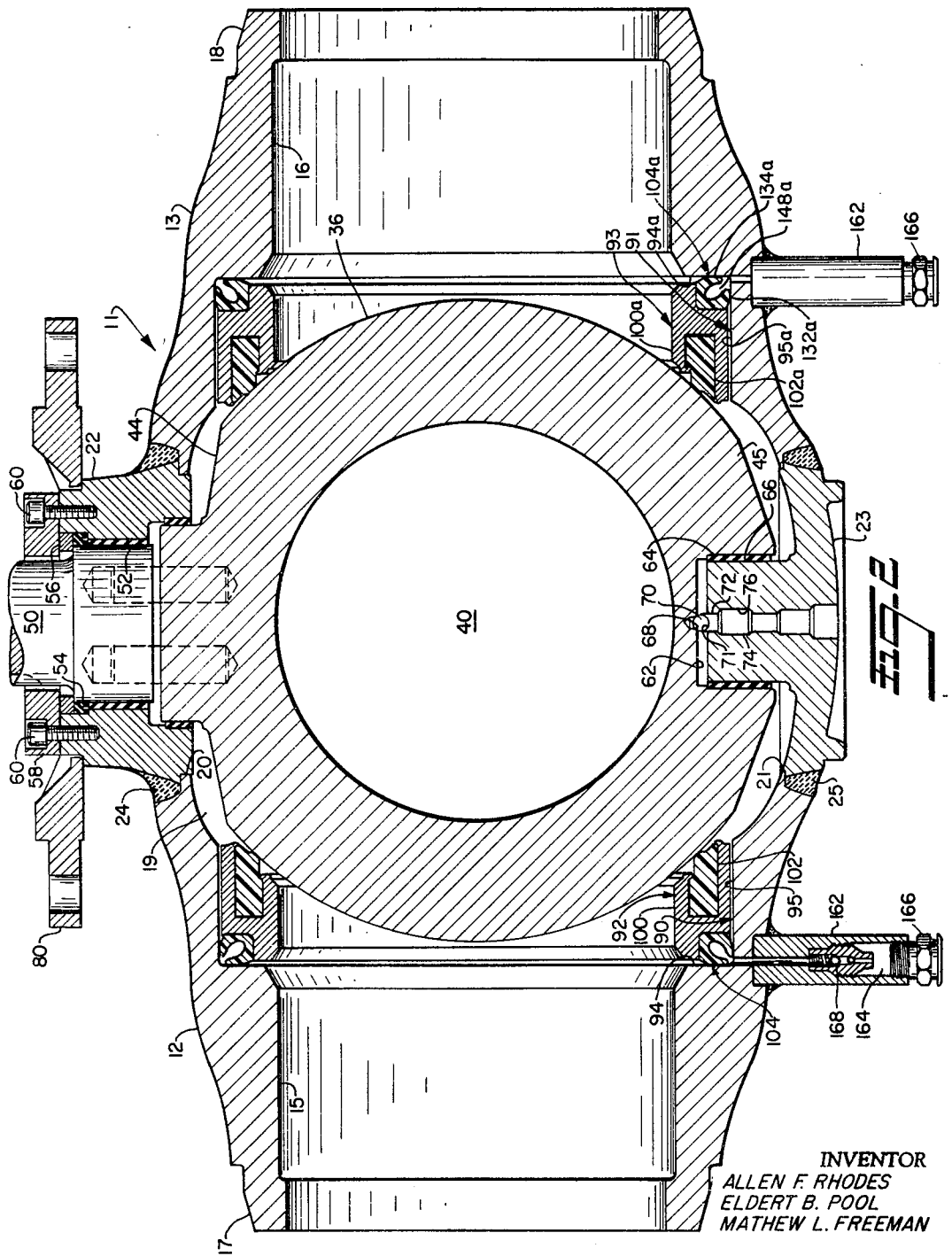
FIG. 2 is a longitudinal section taken substantially along line 2—2 of FIG. 1 and showing the assembly in valve closed condition.

As shown in FIGS. 1–3 the valve of this invention comprises a body 11 having two symmetrical, identically constructed, axially aligned, hollow members 12 and 13 permanently secured together by a weld joint indicated at 14 in FIG. 1. Body members 12 and 13 are respectively formed with tubular end portions which define axially aligned fluid flow passages 15 and 16 therethrough. The outer ends of members 12 and 13 are bevelled at 17 and 18 for welding to a pipeline or the like. The valve, as shown in this embodiment, is a two-way trunnion valve, and for purposes of this disclosure, passage 15 may be considered to be on the inlet or upstream side and passage 16 may be considered to be on the outlet or downstream side.

Still referring to FIGS. 2 and 3, the inner ends of body members 12 and 13 are enlarged and are of generally spherical contour to define a central essentially spherically shaped plug receiving cavity 19. At the top and bottom of body 11, the opposed edges of members 12 and 13 are formed with semi-circular notches which define top and bottom circular apertures 20 and 21. Apertures 20 and 21 are formed along a common axis which extends medially of cavity 19 and which normally intersects the common longitudinal axis of passages 15 and 16.

An upper valve stem trunnion boss 22 coaxially extends through aperture 20, and a lower trunnion member 23 coaxially extends through aperture 21. An annular weld 24 peripherally and coaxially surrounding aperture 20 and boss 22 rigidly joins boss 22 to body members 12 and 13. Similarly, an annular weld 25 peripherally and coaxially surrounding aperture 21 and member 23 rigidly joins member 23 to members 12 and 13. Welds 24 and 25 are axially aligned.

Referring to FIG. 4, the edge of body member 13 opposing body member 12 is undercut to form a recess 26 which receives a complementary, axially extending lip 27. Lip 27 is formed on body member 12 at the inner edge thereof and is annular except for the interruptions made by the semi-circular notches defining apertures 20 and 21. The opposed ends of body members 12 and 13 are respectively formed with opposed surfaces which diverge outwardly to define two arcuate, outwardly opening grooves 30 (one shown in FIG. 5) of generally V-shaped cross section. Grooves 30 are disposed on opposite sides of the valve body and circumferentially extend between welds 24 and 25.

As best shown in FIG. 1, girth welds 32 and 33 are built up in grooves 30 to define joint 14 and rigidly join members 12 and 13 together. Welds 32 and 33 extends continuously between and are joined at opposite ends to welds 24 and 25 on their respective sides of the valve body. Welds 32 and 33 are contained in a common plane normally intersecting the common axis of passages 15 and 16.

Disposed within cavity 19 is a ball-type plug 36 having a cylindrical through port 40 which is of the same diameter as passages 15 and 16. When the valve is open as shown in FIG. 3, port 40 is substantially continuous with passages 15 and 16. At its opposite ends, port 40 terminates in the spherical surface 42 of plug 36. Surface 42 is contained in a spherical envelope and preferably constitutes the entire outer surface of plug 36 except for the top and bottom relieved areas at 44 and 45.

Port 40 is adapted to align with the inner ends of passages 15 and 16 when plug 36 is in its fully opened position shown in FIG. 3. When plug 36 is rotated 90° about its vertical axis to its fully closed position shown in FIG. 2, port 40 extends at right angles to passages 15 and 16 to thus block fluid communication between the valve body passages.

At its upper end, plug 36 is formed with a cylindrical section 46 which is non-rotatably fixed by any suitable means to the lower end of a cylindrical valve stem 50. Stem 50 is journalled by a sleeve bearing 52 in boss 22. A suitable packing 54 disposed around the upper end of stem 50 and held in place by spacer ring 56 and a retaining collar 58 prevents outward leakage of fluid along the valve stem. Collar 58 is detachably secured to boss 22 by cap screws 60 to provide for the renewal of the packing.

At its lower end, plug 36 is formed with a cylindrical recess 62 which is lined with a sleeve bearing 64. Member 23 is integrally formed with a rigid cylindrical trunnion 66 which is coaxially received in bearing 64. The bottom floor of recess 62 is formed with a central conical seat 68 which is concentric with the recess and coaxial with the rotational axis of plug 36. A hard metal, spherical thrust ball 70 is disposed between seat 68 and a concave seat 70 on a thrust seat member 72. Member 72 is abutted by the inner end of an adjustment screw assembly unit 74 which is threaded in a tapped central bore 76 of member 23. Screw unit 74 may be rotated to provide a centralized thrust bearing for plug 36.

From the foregoing description it is clear that plug 36 is rotatable about an axis axially aligning with the axes of stem 50 and trunnion 66 and normally intersecting the longitudinal axes of passages 15 and 16 medially of cavity 19 and perpendicular with respect to port 40. The upper end of boss 22 is advantageously provided with a flange 80 for mounting an unshown power valve operator that is adapted to be operatively connected to stem 50. Boss 22 and trunnion 66 prevent lateral displacement of plug 36 toward and away from the inner ends of passages 15 and 16.

Surrounding the inner ends of passages 15 and 16 are identical, annular, axially aligned recesses 90 and 91 which respectively, slidably receive identically constructed seat ring assemblies 92 and 93. Recess 90 defines the inner end of passage 15 and is formed by a flat surfaced, annular shoulder 94 and a smooth, uniformly diametered internal cylindrical wall surface 95 extending axially between shoulder 94 and cavity 19. Surface 95 is formed with a larger diameter than the remainder of passage 15 and is joined thereto by shoulder 94 which faces cavity 19 and which extends radially outwardly with respect to longitudinal flow passage axis.

The corresponding surfaces defining recess 91 are identified by like reference numerals suffixed with the letter "a."

As best shown in FIG. 5, seat ring assembly 92 consists of a rigid, metallic seat ring 100, an elastically deformable, annular seat ring insert 102, and an annular, elastically deformable, combined spring and seat ring-to-valve body sealing member 104. Insert 102 is seated in a deep annular groove 106 which is formed in seat ring 100 and which opens axially towards plug 36 in coaxial relation with the longitudinal axis of passage 15. Groove 106 is formed with roughened, opposed concentric, annular side walls 108 and 109 and a flat bottom wall 110. Insert 102, which may be made from a suitable plastic or elastomeric material, is integral and solid and is molded into groove 106 to be permanently fixed to the groove walls. As shown, insert 102 completely fills groove 106 and has an annular sealing surface 112 that slidably engages the spherical plug surface 42. Surface 112 preferably projects a small distance axially beyond the seat ring surface 114 facing plug 36 in cavity 19. As will be explained fully later on, spring member 104 axially biases seat ring 100 to a position where insert 102 is compressed against the spherical plug surface 42 to provide an annular fluid tight seal coaxially surrounding the inner end of passage 15.

Still referring to FIG. 5, seat ring 100 is formed with cylindrically smooth, uniformly diametered, concentric, inner and outer peripheral surfaces 116 and 117. The diameter of surface 117 is slightly less than the diameter of the recess surface 95 to provide a small radial clearance indicated at 118 which enables seat ring 100 to accurately align with plug 36. In this connection, it will be appreciated that plug 36 may not accurately line up with passages 15 and 16, but the radial freedom afforded by clearance 118 allows seat ring 100 to shift to a position where it maintains contact with ball plug 36.

As best shown in FIGURE 5, the outer corner of seat ring 100 adjacent to shoulder 94 is cut away to define an annular recess 120 for receiving spring member 104. Recess 120 opens radially outwardly towards surface 95 and also axially towards shoulder 94 and is defined by a flat annular surface 122 and a smooth cylindrical, uniformly diametered peripheral surface 124 which is smoothly joined to surface 122 by an arcuate surface 126. Surface 122 extends radially inwardly from surface 117 and is contained in a plane which normally intersects the longitudinal seat ring axis. Surface 124 is coaxial with the longitudinal seat ring axis and, consequently, concentric with the inner and outer peripheral surfaces 116 and 117. Groove 106 also is concentric with surfaces 116 and 117. In the radial plane of FIG. 5, surfaces 122 and 124 extend along mutually perpendicular lines.

Spring member 104, as shown in FIG. 5, is a solid, integral, molded annular part which is preferably made from polyurethane and which is formed with radial, curved and cylindrical surfaces 128, 129, and 130 which seat on and interfit with the seat ring surfaces 122, 126, and 124 respectively. Member 104 completely fills recess 120 and is securely bonded to surfaces 122, 124, and 126 throughout its entire area of contact with seat ring 100.

According to this invention, spring member 104 is integrally formed with two annular, compressible sealing lips 132 and 134 which are both capable of being flexed by line fluid pressure. Lip 132 extends axially rearwardly and radially outwardly from surface 128 so that in the cross section shown in FIG. 3 a line medially intersecting lip 132 extends at an acute angle with respect to the longitudinal axis of seat ring 100.

As shown, lip 132 circumferentially surrounds the section 136 of seat ring 100 defining the base of recess 120. The free rounded end 138 of lip 132 extends towards shoulder 94 and in its uncompressed, undeformed condition shown in FIG. 8 projects radially beyond the outer periphery of seat ring 100. Lip 132 is defined by inner and outer peripheral surfaces 140 and 142 which diverge from end 138. Surface 142, which is adapted to sealingly contact surface 95 slopes uniformly from end 38 to the region where it intersects surface 128. At this point, the outer diameter of spring member 104 is equal to the outer diameter of seat ring 100.

Lip 134, when unflexed, projects radially outwardly and axially rearwardly from surface 130 such that a line medially intersecting the lip extends at an acute angle with respect to the longitudinal axis of seat ring 100. In cross section, lip 134 extends at an acute angle with respect to lip 132. Lip 134, when unflexed, projects axially beyond a plane containing the end face 143 of seat ring 100 and is defined by outer and inner peripheral surfaces 144 and 145 respectively facing axially toward and away from shoulder 94. Surfaces 144 and 145 diverge from a rounded end 146 of lip 134 as shown. Surface 144 contacts shoulder 94 to provide an annular seal and slopes to a region where it intersects surface 130 in the plane containing the end face 143 of ring 100.

An annular outwardly opening groove or recess 148 defined between lips 132 and 134 is delimited by surfaces 140 and 145 which are smoothly joined to each other by a curved corner surface 149 at the bottom of the recess. When lips 132 and 134 are unflexed, recess 148 diverges outwardly from its bottom surface and opens towards the corner between shoulder 94 and surface 95. Lips 132 and 134 are symmetrically disposed on opposite sides of a line medially intersecting recess 148 and extending at an acute angle of about 45° with respect to the longitudinal axis of the seat ring.

The axial distance between shoulder 94 and the spherical plug surface 42 is made sufficiently short that when assembly 92 is mounted in the valve body, lip 134 will be compressed uniformly throughout its circumference against shoulder 94 and flexed slightly into recess 148 to resiliently urge seat ring 100 towards plug 36 and to a position where surface 112 engages and is slightly compressed against plug surface 112. As a result, insert 102 is pre-loaded or pre-squeezed to provide an initial, fluid tight, seat-to-plug seal in absence of line fluid pressure.

When assembly 92 is centered with respect to the longitudinal axis of passage 15, lip 132 will be compressed uniformerly throughout its circumference against surface 95 and thus flexed slightly into recess 148. Assembly 92 effectively radially floats on lip 132, and the flexure of this lip allows limited radial displacement of assembly 92 for alignment with plug 36. As one example, clearance 118 may be about 0.020 inch when assembly 92 is exactly concentric with surface 95, and lip 132 may engage surface with a 0.045 inch interference fit. Assembly 92 therefore may shift radially by a distance of 0.020 inch to establish metal to metal contact between seat ring 100 and the valve body, while still maintaining a minimum interference fit at 0.025 inch between lip 132 and surface 95. It is important that this lip interference fit be preserved to assure that the seat-to-valve body seal provided by lip 132 is maintained for all radial positions which assembly 92 is capable of shifting to as a result of clearance 118.

The fit afforded by clearance 118 is comparatively loose and greater than the minimum clearance needed for allowing axial displacement of seat ring 100.

Since the arrangement and construction of assembly 93 is the same as that just described for assembly 92, like reference numbers suffixed by the letter "a" have been applied to designated corresponding parts of assembly 93.

When no fluid pressure is applied in the valve body or when the line fluid pressure is low, both of the lips 132 and 132a will be compressed against their internal valve body surfaces to establish circumferential seat-to-valve body seals on the upstream and downstream sides of plug 36. Lips 134 and 134a, under these pressure conditions, will also be compressed against their respective internal valve body surfaces to axially bias inserts 102 and 102a into sealing engagement with plug 36 to establish upstream and downstream seat-to-plug seals. Compression of lips 134 and 134a against shoulders 94 and 94a furthermore establishes additional upstream and downstream seat-to-valve body seals which are contained in planes extending radially of passages 15 and 16.

When plug 36 is in its closed position and the line fluid pressure differential across cavity is relatively high, the upstream high pressure flexes lip 134 inwardly allowing line fluid to enter recess 148 and apply pressure to the inner surface 140 of lip 132. Thus, line pressure fluid acts to further increase the compression of lip 132 against surface 95 for more tightly sealing against leakage from the upstream side of the valve into the valve plug cavity. The axial component of line fluid pressure acted over the outer end of the seat ring to flex lip 134 inwardly and also acting in recess 148 increases the net axial force applied to axially urge seat ring 100 towards plug 36. As a result, a tighter seat-to-valve plug seal will be established.

If the pressure of fluid confined in cavity 19 increases where the valve is closed, it flexes lip 132a radially inwardly to vent the cavity fluid into recess 148a. The axial component of the fluid pressure in recess 148a is applied to the recess surfaces facing axially away from cavity 19 to oppose and thereby reduce the force exerted by cavity fluid pressure tending to axially push seat ring assembly 93 away from plug 36. As a result, the fluid pressure introduced into cavity 148a will combine with the axial spring force exerted by the lip 134a to compress insert 102a more tightly against the spherical plug surface to provide a tighter seat-to-plug seal. Fluid pressure in recess 148a also tends to flex lip 134a out of recess 148a to compress it against shoulder 94a and thus maintain a tight seat-to-valve body seal on the downstream side of cavity 19.

If fluid flow is reversed such that assembly 93 is on the upstream side and assembly 92 is on the downstream side, it is clear that the sealing and spring biasing action of the seat ring lips 132, 134, 132a, and 134a will be the reverse of that just described.

From the foregoing description it will be appreciated that the inherent resiliency of the polyurethane spring members 104 and 104a eliminates the need for separate springs or the like for urging the seat ring inserts 102 and 102a into engagement with plug 36. As compared with other plastic or elastomeric materials, polyurethane is preferred for making members 104 and 104a because it is less subject to permanent set, is more durable in service, is less subject to flutter under dynamic loading conditions, is less likely to tear out of seat rings 100 and 100a, and is exceptionally resistant to wear and abrasion. Moreover, the ability of polyurethane to bond to metal is an exceptional advantage as compared with other elastically deformable materials.

As shown in FIGS. 2, 3, and 5, valve body member 12 is formed with a through bore 160 to fixedly receive a hollow fitting mount member 162 which defines a space 164 for receiving a charge of fluent plastic or lubricant material supplied from an external source. A threaded plug member 166 may be rotated in the outer end of member 162 to pressurize the fluent material in space 164 and force it past a check valve 168 and into the interior of the valve body. Plug member 166 may be an alemite-type or like fitting for introducing the plastic material into space 164 under pressure.

The inner end of bore 160 opens into the valve body at the juncture between surface 95 and shoulder 94 to deliver the pressurized plastic material into recess 148. The pressure exerted by the plastic material in recess 148 flexes lips 132 and 134 outwardly. Lip 132 will therefore be more tightly compressed against surface 95 regardless of axial position of assembly 92. In addition, plastic material introduced under pressure into recess 148 acts to axially jack seat assembly 92 towards plug 36 to provide a tighter seat-to-valve plug seal. In this connection, the pressurized plastic material in recess 148 acts over a part of the recess surface to provide an axial force component opposing the fluid pressure in cavity 19 and acting in the same direction as the spring bias exerted by lip 134 and/or the upstream line fluid pressure for axially jacking or shifting assembly towards plug 36. Thus lip 132 may be pressure-energized and assembly 92 may be jacked toward plug 36 to provide tighter seat-to-valve body and seat-to-valve plug seals by introduction of pressurized plastic material into recess 148 from a source external of the valve.

Preferably a fitting structure like that just described is provided for introducing pressurized plastic material into recess 148a of assembly 93. Like reference numerals have been applied to designate like parts of the fitting structure associated with assembly 93.

In the modification shown in FIG. 9, insert 102 and groove 106 are omitted and seat ring 100 is formed with a solid annular section 177 having an annular seating surface 178 which directly, slidably contacts the spherical surface of plug 36 for establishing a seat-to-plug seal surrounding the inner end of the fluid passage. This seat ring assembly shown in FIG. 9 is otherwise the same as assemblies 92 and 93.

FIGS. 6, 6A, and 6B illustrate a modified form of spring and seat-to-valve body sealing member 180 having circumferential and radial lands 182 and 184 in place of lips 132 and 134 described in previous embodiment. To the extent that member 180 is the same as members 104 and 104a, like reference numerals have been applied to designate like surfaces and portions.

As shown, land 182 is radially raised and is formed with a uniformly diametered, circumferential surface 186 which interfittingly seats against surface 95. The diameter of surface 186, when land 182 is relaxed and uncompressed, is greater than the diameter of seat ring surface 117 and the valve body bore surface 95. Therefore, an interference fit is provided between land 182 and surface 95. The magnitude of this interference fit preferably is about the same as that described between lip 132 and surface 95 in the previous embodiment. As a result, the interference fit between land 182 and surface 95 will be maintained regardless of the position to which assembly 92 is radially shifted. Similar to the previous embodiment, the seat ring assembly shown in FIGURE 6 effectively radially floats on land 182.

Surface 186 is axially spaced from a radial plane containing surface 128 and is joined to surface 128 by an annular surface 188 which uniformly slopes radially inwardly to a corner juncture with surface 128 where the diameter of member 180 is equal to the diameter of surface 117.

Still referring to FIG. 6, land 184 is axially raised and is formed with an annular, flat surface 190 which is contained in a radial plane and which interfittingly seats against shoulder 94. When land 184 is uncompressed, surface 190 is spaced axially from the end face 143 of seat ring 100. The axial dimension between surface 190 and the insert surface 112 engaging plug 36 is somewhat greater than the axial dimension between shoulder 94 and the spherical plug surface engaged by insert 102. This provides an interference fit between land 184 and shoulder 95 to compress the land and to pre-load or pre-squeeze insert 102 against the periphery of plug 36 at zero or low pressure conditions in a manner similar to that described in connection with the first embodiment. Land 184 thus functions as a spring to axially bias the seat ring assembly toward plug 36.

Surface 190 is spaced radially outwardly from surface 130 and is joined thereto by an annular, radial surface 192. Surface 192 slopes axially inwardly to a corner juncture with surface 130 as shown. This juncture is contained in a radial plane passing through the end face 143 of seat ring 100.

The adjacent edges of surfaces 186 and 190 are joined by an annular surface 196 which is beveled at an angle of essentially 45°. Lands 182 and 184 are symmetrically disposed in cross section on opposite sides of a diagonal line medially and normally intersecting surface 196.

Surface 196 cooperates with the valve body shoulder 94 and bore surface 95 to define an annular chamber 200 which is in direct fluid communication with bore 160. Internally, member 180 is formed with a uniformly diametered torous hole or passage 202 which is in fluid communication with chamber 200 through one or more radial passages 204 (one shown in FIG. 6). Passages 204 extend radially through the portion of member 180 between surface 196 and passage 202. Preferably, the longitudinal axes of passages 204 extend normal to surface 196 and intersect the toroidal axis of passage 202 as shown.

The torous passage 202 is shown to be located more closely to surfaces 186 and 190 than to surfaces 128 and 130. Preferably, the circumferential or toroidal axis of passage 202 lies medially between the opposite edges of each of the surfaces 186 and 190. This construction makes the thickness of each of the lands 182 and 184 relatively thin so that expansion of passage by fluid pressure is capable of flexing lands 182 and 184 outwardly to tightly compress surfaces 186 and 190 against bore surface 95 and shoulder 94 respectively. When compressed, lands 182 and 184 distort into passage 202.

Passage 202, by its coaction with lands 182 and 184 described above, provides a spring rate curve for axially biasing the valve seat toward plug 36 which is flatter than the solid spring member 104. Member 180 thus provides a floating seat ring having tight sealing without excessive seat-to-valve plug load as the clearance between seat ring 100 and bore surface 95 is varied when the seat ring assembly is shifted to align with plug 36.

When no fluid pressure is applied in the valve body or when the line fluid pressure is low, both lands 182 and 184, when either on the upstream side or the downstream side of cavity 19, will be compressed against their respective internal valve body surfaces to establish circumferential and radial seat-to-valve body seals. Land 184 will also bias insert 102 into sealing arrangement with plug 36 to establish a seat-to-valve plug seal. The same condition occurs on the downstream side as well as the upstream side of cavity 19.

When plug 36 is in its valve closed position and the line fluid pressure differential across cavity is relatively high, the upstream line fluid pressure tends to distort land 184 inwardly to increase the force axially biasing the seat ring assembly toward plug 36 for establishing a tighter seat-to-valve plug seal.

Any leakage of line fluid past surface 190 or surface 186 enters passage 202 through passage 204 to apply fluid pressure to the toroidal passage interior. As a result, passage 202 tends to stretch to more tightly compress lands 182 and 184 against their valve body surfaces. Fluid continues to enter torous passages 202 until the pressure in passage 202 balances the line fluid pressure acting to flex land 184 inwardly.

When member 180 is on the downstream side of cavity 19 and when the fluid pressure in cavity 19 is relatively high in valve closed position, the cavity pressure tends to distort land 182 into passage 202, and any leakage past land 182 enters passage 202. As a result passage 202 will be expanded to distort lands 182 and 184 outwardly until a balanced pressure condition is reached.

Lands 182 and 184 may be pressure-energized by introducing pressurized plastic material through bore 160, chamber 200, and passages 204 and into passage 202 to stretch and thereby expand the diameter of passage 202. As a result, lands 182 and 184 will be deformed outwardly and compressed more tightly against their respective valve body surfaces.

FIGURE 7 illustrates a modification wherein torous passage 202 is expanded by line fluid pressure instead of fluid pressure from an external source. In this embodiment passages 204 in member 180 have been replaced with radially aligned passages 220 and 222. Passage 220 extends radially through seat ring 100 and opens at its inner end into the upstream fluid passage 15. The opposite end of passage 220 aligns and is in communication with passage 222 which opens into torous passage 202 preferably along an axis intersecting the toroidal axis of passage 202. A plurality of pairs of such aligned passage may be spaced around the seat ring.

With the foregoing passage construction, line fluid from passage 15 enters torous passage 202 to expand or stretch passage 202. As a result, lands 182 and 184 will be distorted outwardly and thus be compressed more tightly against their respective valve body surfaces as the upstream pressure of line fluid increases.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a plug valve assembly having a body formed with upstream and downstream fluid flow passages opening at their inner ends into a valve plug cavity, a ported ball-type valve plug rotatable within said cavity between positions where it respectively blocks and provides fluid communication between said passages, and seat ring means mounted within said body for axial displacement at the inner end of at least one of said passages for engaging a spherical surface on said plug, the improvement comprising an elastically deformable annular member anchored to said seat ring means for axial displacement therewith and being engageable with said valve body (a) to provide an annular fluidtight seal between said seat ring means and said body and (b) to resiliently bias said seat ring means axially into engagement with said plug surface for establishing a seal between said plug and said seat ring means, said elastically deformable member being formed with a circumferential sealing surface compressed against an internal cylindrical wall surface of said body with an interference fit to provide said annular seal between said body and said seat ring means at least when said seat ring means is disposed on the upstream side of said cavity, said seat ring means comprising a rigid metal seat ring having a loose fit in said body for providing a slight radial play to effectively radially float within said body on the portion of said elastically deformable member defining said circumferential sealing surface, said portion of said elastically deformable member being a resilient, radially raised, circumferential land extending radially beyond the outer periphery of said seat ring in its undeformed condition, said elastically deformable member also being formed with a further resilient raised land compressed against a valve body surface extending radially of said one passage to provide the axial bias for urging said seat ring toward said plug, and said elastically deformable member being further formed with a toroidal passage concentric with the longitudinal axis of said seat ring, and said lands being distortable into said toroidal passage by compression against their respective valve body surfaces.

2. The plug valve assembly defined in claim 1 comprising means for introducing fluid pressure into said toroidal passage to expand said toroidal passage for distorting said lands outwardly and into engagement with their respective valve body surfaces.

3. The plug valve assembly defined in claim 2 wherein said fluid pressure introducing means comprises a bore formed through said body, passage means in said member for providing fluid communication between said bore and said toroidal passage, and means for supplying a fluent plastic material from an exterior source through said bore and passage means to said toroidal passage.

4. The plug valve assembly defined in claim 2 wherein said fluid pressure introducing means comprises passage means formed in said seat ring said member for providing fluid communication between said one fluid flow passage and said toroidal passage.

5. In a plug valve assembly having a body formed with upstream and downstream fluid flow passages opening at their inner ends into a valve plug cavity, a ported ball-type valve plug rotatable within said cavity between positions where it respectively blocks and provides fluid communication between said passages, and seat ring means mounted within said body for axial displacement at the inner end of at least one of said passages for engaging a spherical surface on said plug, the improvement comprising an elastically deformable annular member anchored to said seat ring means for axial displacement therewith and being engageable with said valve body (a) to provide an annular fluidtight seal between said seat ring means and said body and (b) to resiliently bias said seat ring means axially into engagement with said plug surface for establishing a seal between said plug and said seat ring means, the inner end of said one of said passages being formed with a diametrically enlarged bore section defined by a radial, annular shoulder and a cylindrically smooth peripheral wall surface extending between said shoulder and said cavity, said seat ring means comprising a rigid seat ring slidably received in said bore section and having at its end remote from said cavity an annular recess opening radially outwardly and toward said peripheral wall surface and axially toward said shoulder said elastically deformable member being seated in said recess and being resiliently compressible against said shoulder to provide the bias for axially urging said seat ring toward said plug, said elastically deformable member being integrally formed with first and second sections, said first section axially protruding from said recess for engagement with said shoulder, and said second section protruding radially from said recess for engagement with and compression against said peripheral wall surface to establish the seal between said seat ring and said bore at least when said seat ring means is on the upstream side of said cavity.

6. The plug valve assembly defined in claim 5 wherein said first section when compressed against said shoulder provides a further annular fluid tight seal between said seat ring and said body.

7. The plug valve assembly defined in claim 5 wherein said first and second sections are respectively defined by a resilient, radially extending, raised land and by a resilient, circumferentially extending raised land, and wherein said member is formed with a toroidal passage concentric with the longitudinal axis of said seat ring, said lands being distortable into said toroidal passage by compression against their respective valve body surfaces.

8. In a valve assembly having a body formed with upstream and downstream fluid flow passages opening at their ends into an internal valve closure member space, and a valve closure member displaceable in said space between positions where it respectively blocks and provides fluid communication between said passages, a seat ring assembly mounted for limited axial displacement within said body at the inner end of at least one of said passages, said seat ring assembly comprising a relatively rigid seat ring, an elastically deformable seat anchored to said seat ring for engagement with said closure member, and an integral annulus of elastically deformable material anchored on said ring and being characterized in that it is formed with two endless surfaces and an annular groove separating said endless surfaces and opening outwardly and away from said space, one of said endless surfaces being seated against a first internal surface of said body along an interface extending transversely of said one passage for axially biasing said assembly toward said closure member to deform said seat against said closure member, and the other of said endless surfaces being seated against a second internal surface of said body to provide an annular seal between said seat ring and said body along a circumferential interface peripherally surrounding the longitudinal axis of said assembly.

9. The valve assembly defined in claim 8 wherein the other of said endless surfaces is formed on an annular lip projecting away from said space in peripheral surrounding relation to the longitudinal axis of said assembly, said lip being deformable into said groove by engagement with said second internal surface.

10. The valve assembly defined in claim 8 wherein said closure member is a ported, ball-type valve plug, and wherein said valve assembly further comprises means journalling said plug for rotation between said positions and confining said plug against displacement toward and away from the inner end of each of said passages.

11. In a valve assembly having a body formed with upstream and downstream fluid flow passages opening at their inner ends into an internal valve closure member cavity, and a valve closure member displaceable in said cavity between positions where it blocks and provides fluid communication between said passages, a seat ring assembly mounted for free sliding axial movement between said closure member and an opposing internal surface of said body at the inner end of at least one of said passages, said seat ring assembly comprising a relatively rigid seat ring, a seat positioned on said seat ring for engagement with said closure member, and an integral annulus of elastically deformable material anchored on said seat ring and being characterized in that it is formed with first and second annular portions and has an annular space formed axially and radially inwardly of said first and second annular portions respectively, said space being located between said first and second annular portions to at least partially separate said annular portions, said first annular portion being seated against said internal surface for axially biasing said assembly toward said closure member to urge said seat against said closure member, and said second annular portion being seated against a further internal surface of said body to provide an annular seal between said seat ring and said body along a circumferential interface peripherally surrounding the longitudinal axis of said assembly at least when said assembly is mounted in the upstream one of said passages, said annular portions each being deformable into said space by seating engagement with said opposing internal surface and said further internal surface respectively.

12. The valve assembly defined in claim 11 wherein said seat comprises an elastically deformable member anchored to said seat ring and being deformed against said closure member by the axial bias exerted by said first annular portion.

13. The valve assembly defined in claim 12 wherein said closure member is a ported, ball-type valve plug, and wherein means are provided for journalling said plug for rotation between said positions and for confining said plug against displacement toward and away from the inner end of either of the upstream and downstream passages.

14. The valve assembly defined in claim 12 wherein said annulus is formed from polyurethane.

15. The valve assembly defined in claim 11 wherein said annular space comprises an annular groove opening into the interior of said body at a mouth which is disposed between said first and second portions.

16. The valve assembly defined in claim 15 wherein the surfaces of said first and second portions which seat against said internal surfaces are separated by said annular groove.

17. The valve assembly defined in claim 16 wherein said opposing internal surface and said further internal surface are joined at a corner into which said annular groove opens.

18. The valve assembly defined in claim 17 comprising passage means extending through said body and opening into said corner, and means for delivering plastic material under pressure through said passage means for introduction into said annular groove to jack said assembly toward said closure member.

19. The valve assembly defined in claim 15 wherein at least said second annular portion comprises an annular lip extending axially away from said cavity to a free end portion which is flexible radially into said annular groove.

20. The valve assembly defined in claim 15 wherein said first and second annular portions respectively comprise first and second annular lips terminating at the mouth of said annular groove in free end portions which are flexible into said annular groove.

21. The valve assembly defined in claim 20 wherein said first annular lip provides a further annular seal between said body and said seat ring when it is compressed against said opposing internal surface along an uninterrupted annular interface.

22. The valve assembly defined in claim 15 wherein said closure member is a ported, ball-type valve plug, and wherein said valve assembly further comprises means for journalling said plug for rotation between said positions and for confining said plug against displacement toward and away from the inner end of either of said passages.

23. The valve assembly defined in claim 11 wherein said space comprises a toroidal passage concentric with the longitudinal axis of said seat ring.

24. The valve assembly defined in claim 23 wherein said first and second annular portions respectively comprise first and second raised lands respectively extending axially and radially beyond said seat ring in undeformed condition, said first and second lands having spaced apart surfaces respectively seated against said opposing internal surface and said further internal surface.

25. The valve assembly defined in claim 24 wherein said first land when compressed against said opposing internal surface along an uninterrupted annular interface provides a further fluid tight seal between said seat ring and said body.

26. The valve assembly defined in claim 23 comprising means for introducing a fluent plastic material under pressure into said toroidal passage from a source located exteriorly of said body.

27. The valve assembly defined in claim 23 wherein said closure member is a ported, ball-type valve plug, and wherein means are provided for journalling said plug for rotation between said positions and for confining said plug against displacement toward and away from the inner end of either of the upstream and downstream passages.

28. The valve assembly defined in claim 11 wherein said seat comprises a surface forming a part of said seat ring.

29. The valve assembly defined in claim 11 comprising means for selectively introducing pressurized plastic material from an external source into said space for jacking said seat ring assembly axially toward said closure member and for simultaneously deforming at least said first annular portion out of said space and toward said opposing internal surface.

30. The valve assembly defined in claim 29 wherein said seat comprises an elastically deformable annular member anchored on sadi seat ring, wherein said closure member comprises a ported, ball-type plug, and wherein means are provided for journalling said plug for rotation between said positions and for preventing displacement of said plug toward and away from the inner end of each of said passages, said elastically deformable member and said first annular portion being prestressed by concomitant compression against said plug and said opposing internal surface respectively, and said elastically deformable member being deformed against said plug by the axial bias exerted by said first annular portion to provide a seat ring-to-plug seal, said elastically deformable member being further deformed against said plug by the introduction of said plastic material to increase the tightness of said seat ring-to-plug seal.

31. The valve assembly defined in claim 11 characterized in that said first annular portion is capable of being flexed into said space by a fluid pressure differential between said at least one passage and said space to provide for leakage of fluid from said one passage into said space when the pressure in said one passage exceeds that in said space.

32. In a valve assembly having a body formed with upstream and downstream passages opening at their inner ends into an internal valve closure member cavity, and a valve closure member displaceable in said cavity between positions where it respectively blocks and provides fluid communication between said passages, a seat ring assembly mounted at the inner end of at least one of said passages for axial sliding movement between said closure member and an opposed internal surface of said body, said seat ring assembly comprising a relatively rigid seat ring, a seat positioned on said seat ring for engagement with said closure member, and an annulus of elastically deformable material anchored on that end of said seat ring which is remote from said cavity, said annulus having first and second annular portions extending in relaxed condition axially and radially beyond said ring and an annular space formed inwardly of and between said portions to at least partially separate said first and second portions, said first and second portions being respectively compressed against said opposed, internal surface and an internal cylindrical surface of said body, said first annular portion providing only a uni-directional seat ring-to-body seal to prevent fluid leakage from said space to said one passage and being deformable by fluid pressure into said space to allow fluid leakage into said space when the fluid pressure in said one passage exceeds that in said space, said second annular portion providing only a uni-directional seat ring-to-body seal to prevent fluid leakage from said space into said cavity and being deformable by fluid pressure into said space to allow fluid leakage from said cavity to said space when the fluid pressure in said cavity exceeds that in said space.

33. In a valve assembly having a body formed with upstream and downstream fluid flow passages opening at their inner ends into an internal valve closure member cavity, and a valve closure member displaceable in said cavity between positions where it blocks and provides fluid communication between said passages, a seat ring assembly mounted for free sliding axial movement between said closure member and an opposing internal surface of said body at the inner end of at least one of said passages, said seat ring assembly comprising a relatively rigid seat ring, a seat positioned on said seat ring for engagement with said closure member, and an integral annulus of elastically deformable material anchored on said seat ring and being characterized in that it is formed with two annular surfaces and an annular groove separating said annular surfaces and opening outwardly and away from said cavity, one of said annular surfaces being seated against said opposing internal surface along an interface extending transversely of said one passage for axially biasing said seat ring assembly toward said closure member, and the other of said annular surfaces being seated against a second internal surface of said body to provide an annular seal between said seat ring and said body.

34. The valve assembly defined in claim 33 wherein said seat comprises an elastically deformable member anchored to said seat ring and being deformed against said closure member, wherein said closure member is a ported, ball-type valve plug, and wherein means are provided for journalling said plug for rotation between said positions and for preventing displacement of said plug toward and away from the inner end of either the upstream passage or the downstream passage.

35. The valve assembly defined in claim 34 wherein said annular surfaces are respectively formed on first and second annular portions which are integral with said annulus and which define the opposite side of said annular groove, said first and second annular portions being deformable into said groove by engagement of their respective annular surfaces with said opposing and second internal surfaces respectively.

36. The valve assembly defined in claim 35 wherein said second annular portion comprises an annular lip projecting away from said cavity in peripheral surrounding relation to the longitudinal axis of said seat ring assembly, said lip terminating in a free end portion which is deformable into said groove by engagement with said second internal surface.

References Cited

UNITED STATES PATENTS

| | | | |
|---|---|---|---|
| 1,868,147 | 7/1932 | Kruse | 251—172 |
| 2,653,004 | 9/1953 | Schnyder | 251—172 |
| 3,055,670 | 9/1962 | Sampson | 277—226 XR |
| 3,147,015 | 9/1964 | Hanback | 277—205 |
| 3,331,582 | 7/1967 | Ford | 251—368 |
| 3,373,967 | 3/1968 | Scaramucci | 251—315 XR |
| 3,380,708 | 4/1968 | Scaramucci | 251—315 XR |

FOREIGN PATENTS 907,621   10/1962   Great Britain.

HAROLD W. WEAKLEY, Primary Examiner

U.S. Cl. X.R.

251—315; 277—205, 226